United States Patent [19]
Larson

[11] Patent Number: 5,999,199
[45] Date of Patent: Dec. 7, 1999

[54] NON-SEQUENTIAL FETCH AND STORE OF XY PIXEL DATA IN A GRAPHICS PROCESSOR

[75] Inventor: Michael K. Larson, Kirkland, Wash.

[73] Assignee: Cirrus Logic, Inc., Fremont, Calif.

[21] Appl. No.: 08/968,502

[22] Filed: Nov. 12, 1997

[51] Int. Cl.$^6$ .................................................. G06F 13/16
[52] U.S. Cl. .......................... 345/521; 345/515; 345/508
[58] Field of Search .......................... 345/501, 507–509, 345/513, 521, 515, 516, 517

[56] References Cited

U.S. PATENT DOCUMENTS

| | | | |
|---|---|---|---|
| 3,988,728 | 10/1976 | Inoue et al. ............................... | 340/324 |
| 4,189,728 | 2/1980 | Stubben .................................... | 340/725 |
| 4,267,573 | 5/1981 | Chaikin et al. ........................... | 364/515 |
| 4,546,451 | 10/1985 | Bruce ........................................ | 364/900 |
| 4,906,986 | 3/1990 | Takeda ...................................... | 340/799 |
| 4,935,880 | 6/1990 | Kelleher et al. ......................... | 364/522 |
| 4,965,751 | 10/1990 | Thayer et al. ............................ | 364/521 |
| 4,974,175 | 11/1990 | Suzuki et al. ............................ | 364/522 |
| 5,043,717 | 8/1991 | Takeda ...................................... | 340/799 |
| 5,088,050 | 2/1992 | Ito ............................................. | 395/142 |
| 5,131,080 | 7/1992 | Fredrickson et al. .................... | 395/164 |
| 5,170,468 | 12/1992 | Shah et al. ................................ | 395/166 |
| 5,193,148 | 3/1993 | Alcorn et al. ............................ | 395/157 |
| 5,218,674 | 6/1993 | Peaslee et al. ........................... | 395/166 |
| 5,233,689 | 8/1993 | Rhoden et al. ........................... | 395/162 |
| 5,251,296 | 10/1993 | Rhoden et al. ........................... | 395/164 |
| 5,287,452 | 2/1994 | Newman ................................... | 395/166 |
| 5,311,211 | 5/1994 | Simpson ................................... | 345/189 |
| 5,325,486 | 6/1994 | Omori et al. ............................. | 395/164 |
| 5,329,617 | 7/1994 | Asal .......................................... | 395/166 |
| 5,347,621 | 9/1994 | Yutaka ...................................... | 395/131 |
| 5,347,624 | 9/1994 | Takanashi et al. ....................... | 395/157 |
| 5,357,605 | 10/1994 | Rupel et al. .............................. | 395/164 |
| 5,414,811 | 5/1995 | Parulski et al. .......................... | 395/162 |
| 5,430,838 | 7/1995 | Kuno et al. ............................... | 395/157 |
| 5,455,908 | 10/1995 | Ishida ....................................... | 395/166 |
| 5,461,712 | 10/1995 | Chelstowski et al. ................... | 395/164 |
| 5,486,876 | 1/1996 | Lew et al. ................................. | 348/719 |
| 5,517,609 | 5/1996 | Guillemaud et al. .................... | 395/162 |
| 5,522,021 | 5/1996 | Huang et al. ............................. | 395/138 |
| 5,668,941 | 9/1997 | Noorbakhsh ............................. | 345/434 |
| 5,815,168 | 9/1998 | May .......................................... | 345/516 |
| 5,828,382 | 10/1998 | Wilde ....................................... | 345/509 |

OTHER PUBLICATIONS

U.S. application No. 08/667,207, May et al., filed Jun. 20, 1996.

U.S. application No. 08/576,871, May, filed Dec. 20, 1995.

*Primary Examiner*—Kee M. Tung
*Attorney, Agent, or Firm*—Steven A. Shaw

[57] ABSTRACT

A graphics system includes a graphics processor for rendering graphics primitives with a list of display parameters. A host processor generates a display list which includes a XY address for rendering the graphics primitives. A graphics processor which includes internal fetch and store static random access memory (SRAM) devices for storing pixel fetched from an external memory device and processed in the graphics processor respectively. The graphics processor also includes a memory control logic which determines whether fetch and store requests by the graphics processor crosses an X boundary in the internal SRAM devices. If a fetch or store request crosses an X boundary, the memory control logic divides the access into two separate accesses which are then non-sequentially accessed during a single data request cycle. By non-sequentially fetching and storing data, the graphics processor is able to execute a single X crossing for multiple Y scan-line operations to fetch or store data internally.

19 Claims, 7 Drawing Sheets

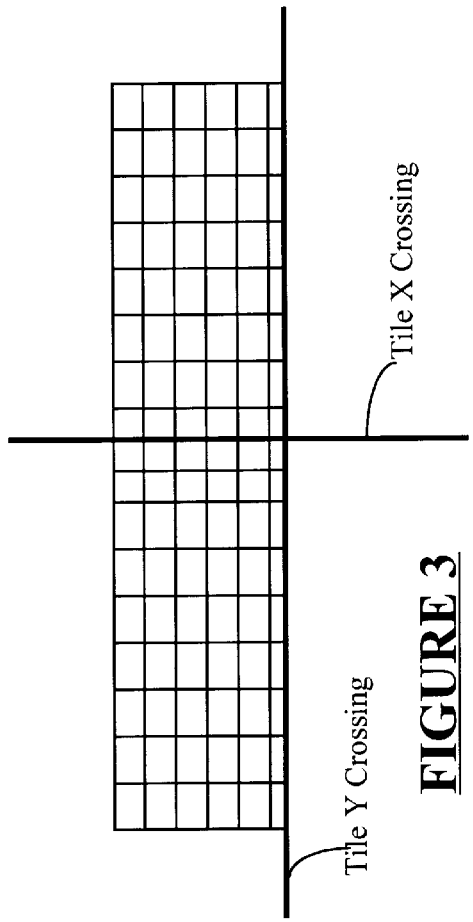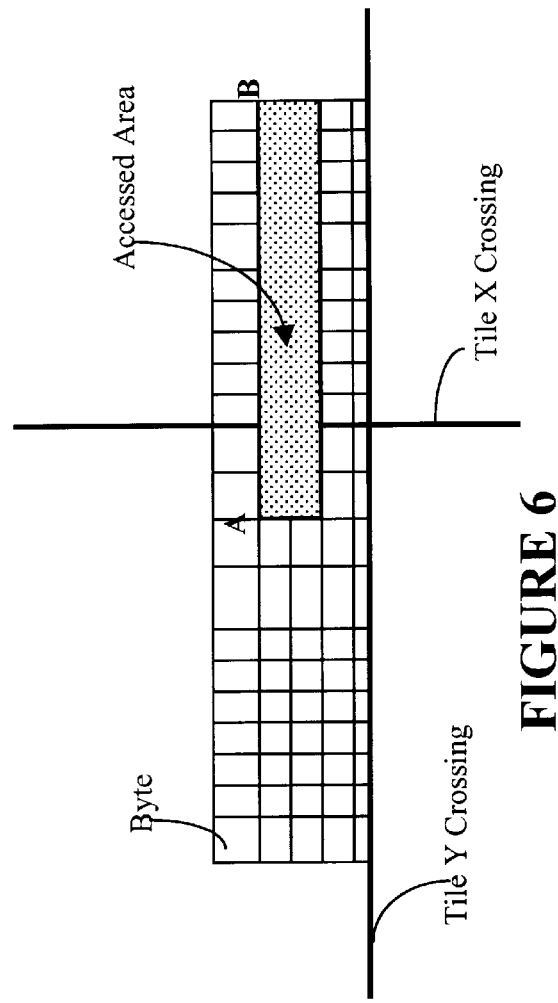
FIGURE 3
FIGURE 6

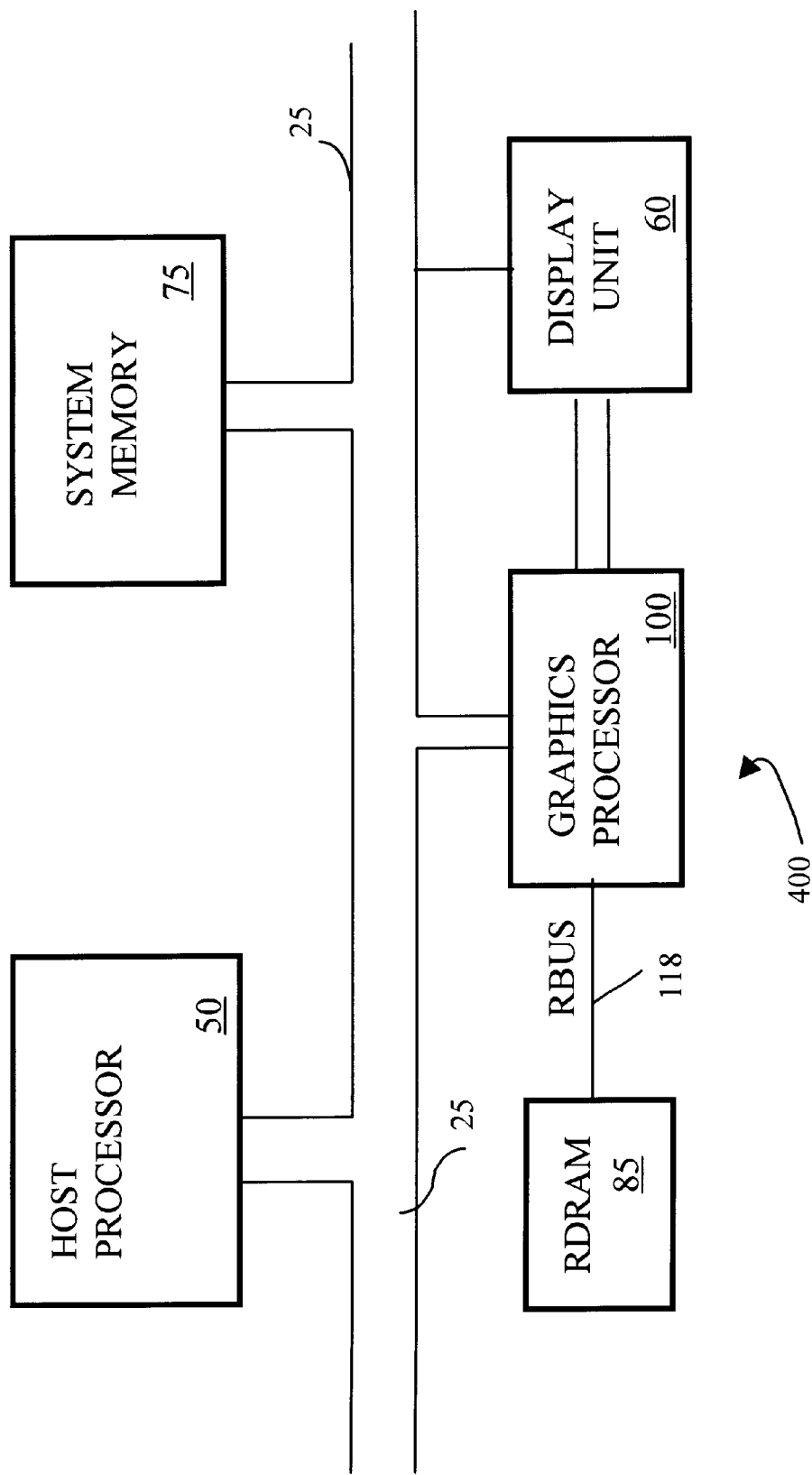

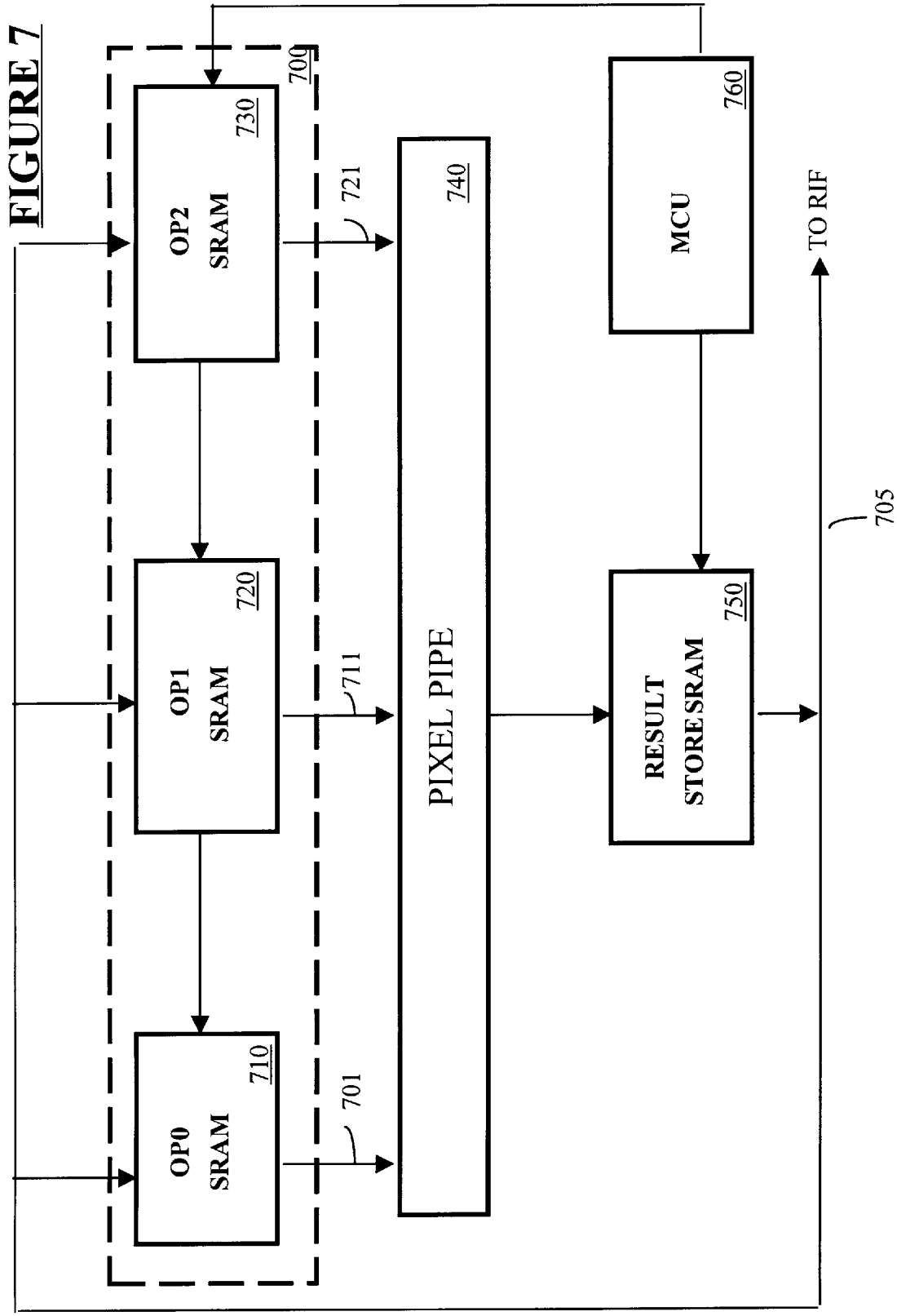

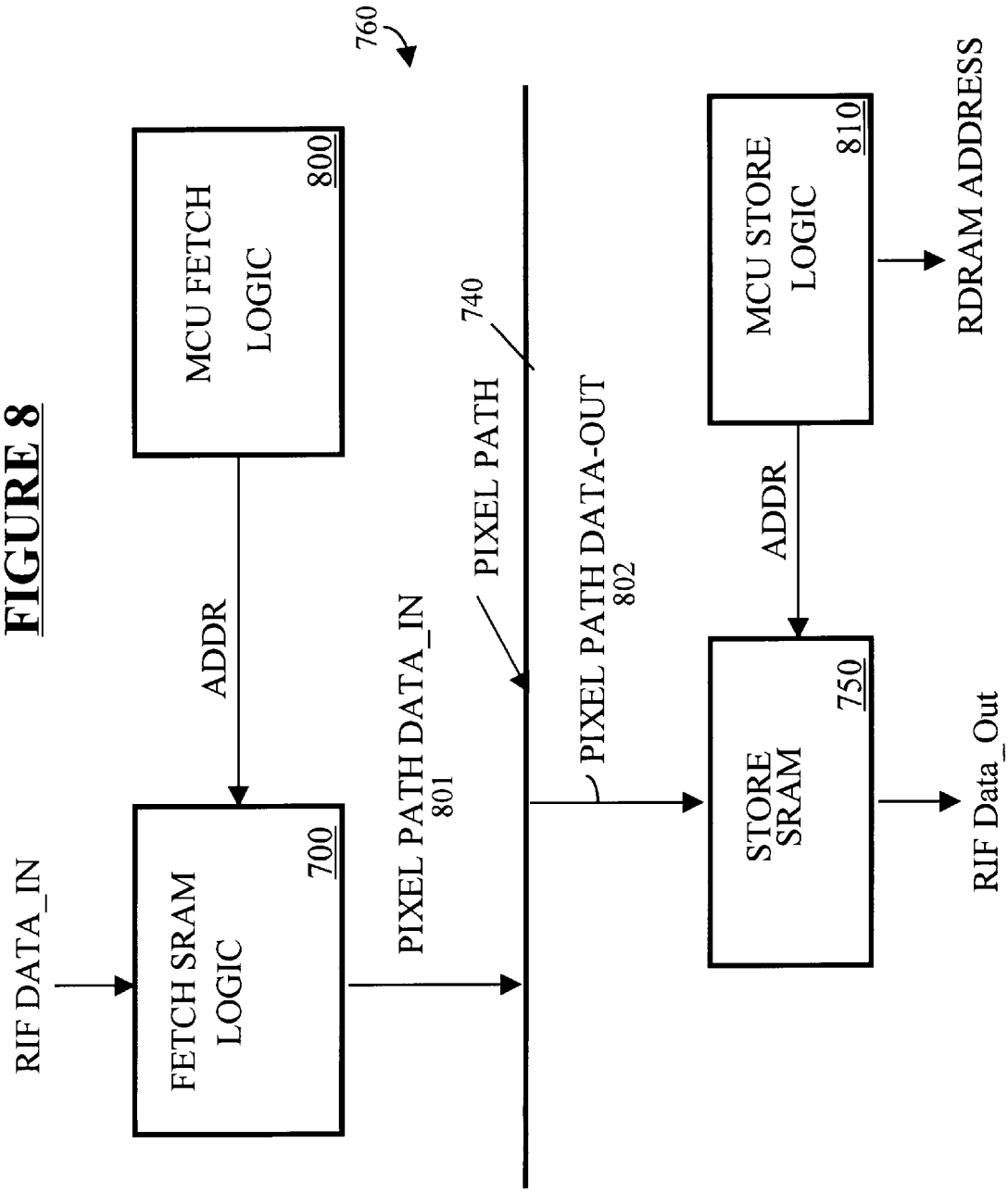

NON-SEQUENTIAL FETCH AND STORE OF XY PIXEL DATA IN A GRAPHICS PROCESSOR

FIELD OF INVENTION

The present invention relates generally to a graphics system for personal computers. More particularly, the present invention relates to a method and apparatus for internally caching XY pixel addresses in a graphics processor.

DESCRIPTION OF THE RELATED ART

Sophisticated graphics packages have been used for some time in expensive computer design and graphics systems. Increased capabilities of graphics controllers and display systems, combined with standardized graphics languages, have made complex graphics functions available in even the most routine applications. For example, word processor, spread sheets and desktop publishing packages now include relatively sophisticated graphics capabilities. Three-dimensional (3D) displays have become common in games, animation, and multimedia communication and drawing packages.

The availability of sophisticated graphics in PCs has driven a demand for even greater graphics capabilities. To obtain these capabilities, graphics systems must be capable of performing more sophisticated functions in less time to process greater amounts of graphical data required by modern software applications. In particular, there is a continuing need for improvements in software algorithms and hardware implementations to draw three-dimensional objects using full color, texture mapping and transparency blending.

Improvements have been made in the hardware realm. Graphics processors and accelerators are available with software drivers that interface with a host central processing unit to the graphics processor. In general, the graphics software receives information for drawing objects on a computer screen, calculates certain basic parameters associated with the objects and provides this to the graphics processor in the form of a "display list" of parameters.

A graphics controller then uses the display list values in generating the graphics objects to be displayed. A graphics processor may use interpolation techniques where the fundamental information for the object to be drawn comprises a series of initial and incremental parameters or values. The graphics processor loads or otherwise receives the initial parameters for the pixels to be drawn, interpolate the object by incrementing the parameters until the object is completely drawn.

In addition to the basic position and color parameters, graphics processors are available which permit the texture of polygons to be represented as part of the display. A texture may be defined as an image of a pattern generated by the graphics processor. A texture may, for example, be thought of such as a sandpaper, a roadbed and so forth or as a pattern of pixels(picture element) on a sheet of paper. The pixel may be arranged in a regular pattern such as a checkered board or may exhibit high frequencies as in a detailed photograph of high resolution.

While a pixel grid stored in memory is represented by a two dimensional space in a linear accessed memory, perspective mapping of texture maps often results in texel samples to move through a texture map in a non-linear fashion. Most graphics subsystems store pixel data and text in memory external to the processor.

Storing the data and text in main memory may require a graphics drawing engine to access the texture maps via system bus external to the graphics processor. Each such access and transfer of the texture maps results in processing latency. These latencies substantially slow down the rate at which the graphics processor can therefore process pixel data.

Display memory typically comprise of DRAM (Dynamic Random Access Memory) or the like. A characteristic of DRAMs is that they are organized as a two dimensional array of bit cells. DRAMs replicate these arrays once for each I/O bit. For example, a 16 bit wide DRAM has 16 arrays each of which contributes one data bit.

Accessing a row of the array causes that row to be cached in the DRAM. Therefore, subsequent accesses to data words in different columns of the same row (Column access) are much faster than access to different rows (row access).

Accesses within a row may be made in what is referred to as page mode; whereas accesses to different rows may require a page miss or random access memory cycle. A page mode access may take on the order of 6–9 memory clock cycles.

In order to enhance the performance of the graphics processor, some prior art systems require access to DRAMs to remain in page mode and thus minimize the number of row accesses.

For graphics mode, in order to provide a continuous pixel stream at the characteristic rate of a display device, pixel data may be stored in the display memory in a sequentially addressed format corresponding to the display device.

Figures 1, 2:
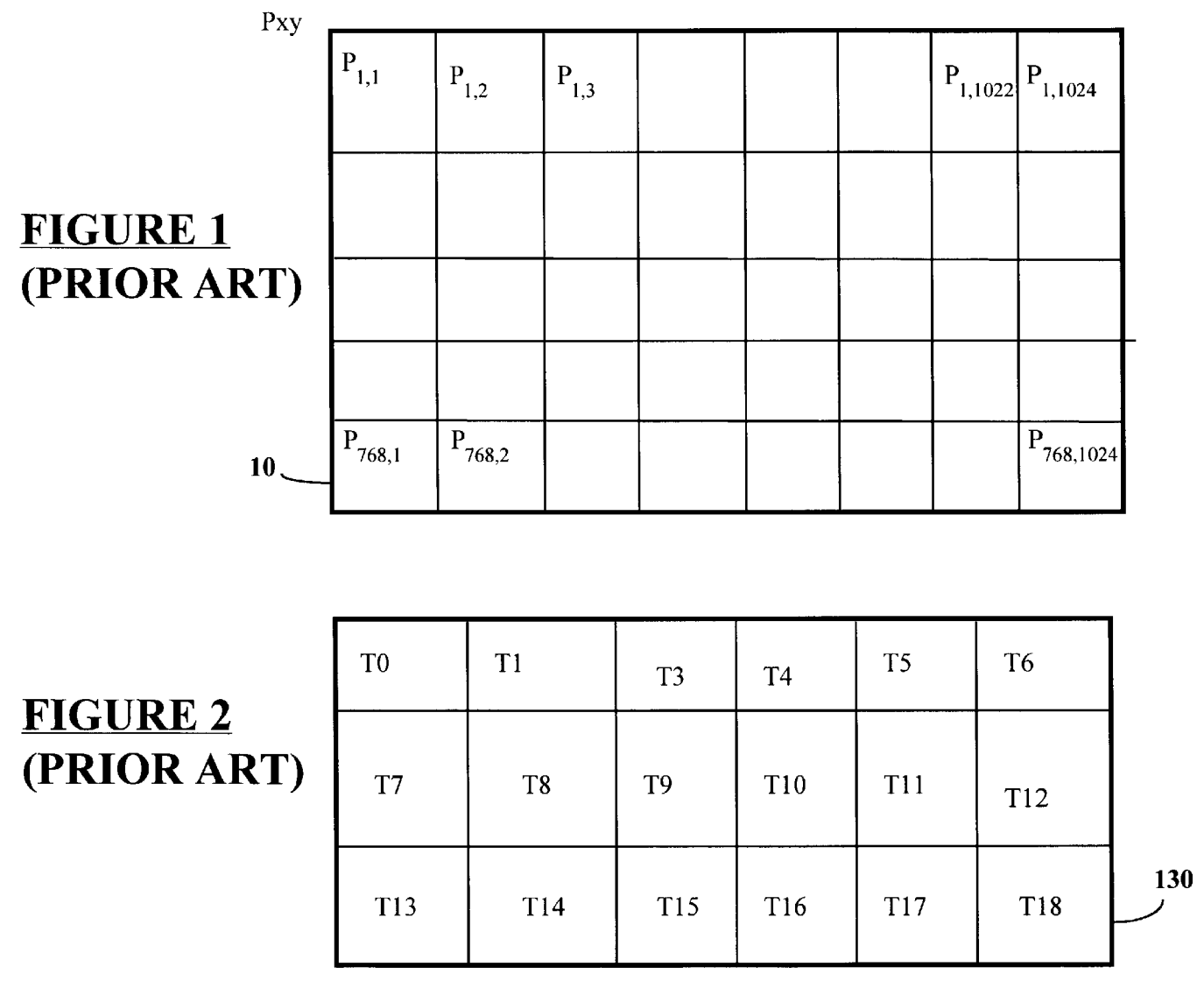

FIG. 1 illustrates how a prior art display memory 10 may be organized for access by a graphics processor. For purposes of illustration, not all pixels of the display are shown. Each pixel is represented by Pxy where x indicates scanline in the x position and y indicates scanlines within a y position.

The display memory 10 shown in FIG. 1 may comprise a display memory having a row size of about 2048 bytes. Thus data for two scan lines for the display device may be stored within one row of display memory 10 as illustrated in FIG. 1. Each pixel may be stored in a different byte location in display memory 10 where x represents scan line number (1-768) and y represents pixel location (1-1024). Each scan line to be displayed on the display device may be stored within a page or pages of display memory 10 allowing for the use of page mode addressing when outputting data. Such an ordering technique allows for quick sequential output of pixel data to the display device. When data is to be retrieved from display memory 10 to refresh the display device, individual pixel data may be retrieved in successive fashion from display memory 10 using page mode access.

However, with the advent of advanced 2D and 3D graphics, such a sequential access to display memory 10 to fetch pixel data may create a bottleneck and substantially slow down the rate at which the graphics processor processes pixel data.

Thus, one alternative to the memory architecture shown in FIG. 1 is a prior art approach of organizing display memory on a tile basis rather than a scanline basis. FIG. 2 illustrates display 130 where an image may be divided into a number of tiles, each of which may be stored on a page or pages of memory. In the example of FIG. 2, a 1024×768 image having a pixel depth is divided into 384 tiles. Each tile is 128 bytes wide and 16 lines in height. The overall arrangement of tiles comprise 42 rows of eight tiles apiece. Of course, other pixel resolutions or tile sizes can be used as is known in the art.

In the example illustrated in FIG. 2, data representing an image can cross tile boundaries which may require a data fetch by the graphics processor to cross tile boundaries. In a typical tiled memory subsystem, tile crossings are defined as the crossing from one tile to another. As memory is fetched in the X direction as illustrated in FIG. 3, tiles are crossed when the address for the current pixel increments past a tile boundary.

In a tiled DRAM memory system, page or tile boundary crossing causes extra delays in sequential accesses due to row column mapping of the DRAM.

Thus, a new row address needs to be issued as page boundaries are crossed. The extra delay when mapping to a tiled memory can result in a significant number of page crossings when an access requires a Y extent (Y incremental crossing) of greater than one.

For example, if the graphics processor is to make accesses to the display memory 130 (FIG. 2) which requires scanline "N" to "N"+4 to be fetched across a tile boundary. As bytes are accessed in the X direction, each X crossing of a tile boundary causes a page break. If 8 bytes are fetched on each side and a page crossing incurs an additional 12 cycles, then the total number of extra or wasted cycles is ((n+4)−n)*12= 48 wasted cycles.

Conventionally, such wasted cycles in X crossing (as shown in FIG. 3) have been acceptable in the prior art because prior art graphics processor could use software to stripe a block transfer of pixel data from memory to prevent X crossing from being a performance bottleneck. However, the combined use of software and hardware to prevent the inherent problems with X crossing across tile boundaries can be very expensive depending on the type of application being executed by the graphics processor. Additional memory bandwidth may also be needed to support such software and hardware implementation. Furthermore, with the amount of instructions performed by today's advanced processors, the additional wasted access cycles in X crossing in a tile configured memory device can substantially affect the performance of the overall computer system.

Thus, a method of reducing the memory bandwidth of the graphics processor while rendering graphics primitives such as polygons within the graphics subsystem while maintaining the processing speed of the central processing unit (CPU) is needed. The present invention provides the advantageous functionality of a graphics processor capable of internally accessing polygon data without the bottleneck of the prior art method of pixel address fetches and stores while reducing the memory store.

SUMMARY OF THE INVENTION

This need and others are substantially met through provision of a method and a system for non-sequentially fetching and storing pixel data when the pixel data crosses an X boundary in a tile configured memory device.

In accordance with the preferred embodiment of the present invention, storage devices internal to a graphics processor are monitored to determine when a fetch or store request crosses a X boundary in order to implement the non-sequential fetch and store principles of the present invention. The preferred embodiment of the present invention preferably includes a graphics processor coupled to a system bus for receiving display instructions from a host processor. The host processor provides instructions for pixel data for graphics primitives to be rendered by the graphics processor.

The graphics processor includes a plurality of internal fetch static random access memory (SRAM) devices, each about 128 byte wide and tile configured to store data fetched by the graphics processor from an external memory source. The graphics processor also includes a second SRAM device for internally storing pixel data processed by the graphics processor before such data is rendered to a display device.

In the preferred embodiment of the present invention, a memory control unit which includes a fetch data logic and a store data logic circuitry couples to the plurality of fetch SRAMs and the store SRAM respectively to control fetch and store request by the graphics processor to the SRAMs. The memory control logic circuitry also includes an X crossing logic to monitor and detect when a fetch or store request by the graphics processor crosses an X boundary. The fetch and store logic in the memory control unit allows the graphics processor to non-sequentially fetch or stock blocks of pixel data within one access request even if the block of data requested crosses an X boundary in the SRAMs.

Accordingly, the present invention is able to fetch and store requests in a lesser number of memory cycles than the prior art's sequential method of accessing pixel data. This and further advantages of the present invention will become apparent upon reading the detailed description which follows.

BRIEF DESCRIPTION OF THE DRAWINGS

A better understanding of the present invention can be obtained when the following detailed description of the preferred embodiment is considered in conjunction with the following drawings in which:

FIG. 1 is a block diagram illustrating how a prior art display memory is organized on a scan line basis;

FIG. 2 is a simplified block diagram illustrating how a prior art display memory is organized in a tile;

FIG. 3 is an exemplary diagram depicting the concept of tile X and Y crossing;

FIG. 4 is a simplified block diagram of a computer system having a graphics processor, in accordance with the principles of the present invention;

FIG. 6 is an exemplary diagram depicting a pixel data block spanning across an X boundary (crossing) in accordance to the principles of the present invention;

FIG. 7 is a simplified block diagram showing in more detail portions of the 2D/3D engine of FIG. 4;

FIG. 8 is a simplified block diagram showing the fetch and store logic of the 3D engine of FIG. 4 in accordance with the principles of the present invention.

DETAIL DESCRIPTION OF THE PRESENT INVENTION

Figure 5:
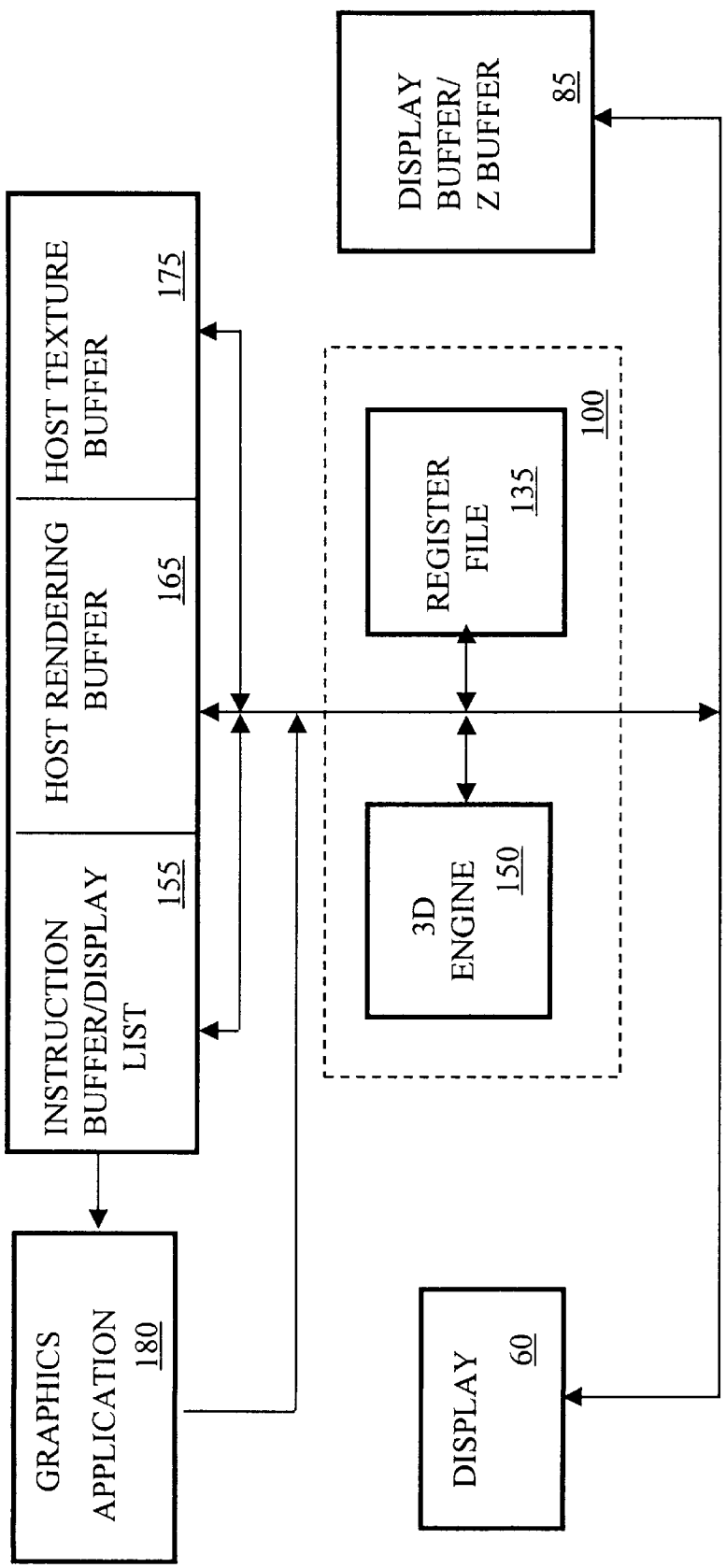
FIG. 5 is a simplified block diagram showing in detail the graphics processor of FIG. 3.

A method and apparatus for providing a means of internally storing and fetching XY pixel addresses in a non-sequential manner in a graphics device is disclosed.

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well know methods, procedures, components, and circuits have been described in detail as not to unnecessarily obscure aspects of the present invention.

Some portions of the detailed description which follow are represented in terms of procedures, logic blocks, processing, and other symbolic representations of operations on data bits within a computer system. These descriptions and representations are the means used by those skilled in the art to most effectively convey the substance of their work to other skilled in the art. A procedure, logic block, process etc., is herein, and generally, conceived to be a self-consistent sequence of steps or instructions leading to a desired result.

The steps are those requiring physical manipulations of physical quantities. Usually, signals capable of being stored, transferred, combined, compared, and otherwise manipulated in a computer system. For reasons of convenience, and with reference to common usage, these signals are referred to as bits, values or the like with reference to the present invention.

It should be borne in mind, however, that all of these terms are to be interpreted as referencing physical manipulations and quantities and merely convenient labels and are to be interpreted further in view of terms commonly used in the art. Unless specifically stated otherwise as apparent from the following discussions, it is understood that thorough discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

With reference to FIG. 4, a block diagram is shown of a host computer system 400 used by the preferred embodiment of the present invention. In general, host computer 400 comprises a bus 25 for communicating data and instructions, a host processor (CPU) 50 coupled to bus 25 for processing data and instructions, a computer readable memory unit 75 coupled to bus 25 for storing data and instructions from the host processor 50.

The host processor 50 provides data and control signals via bus 25 to a graphics hardware subsystem. The graphics hardware includes a graphics processor 100 which executes a series of display instructions and data for rendering graphics objects. The graphics processor 100 supplies data and control signals to a frame buffer 85 which refreshes the display device for rendering images on display device 60. The display device 60 utilized with the computer system 400 of the present invention can be a liquid crystal device, cathode ray tube, or other display device suitable for creating graphics images and alphanumeric characters recognizable to the computer user.

It should be understood that the particular embodiment shown in FIG. 4 is only one of many possible implementations of a graphics system for use in a computer system. FIG. 4 is simplified for purposes of clarity so that many components and control signals are omitted which are not necessary to understand the present invention.

In the preferred embodiment, the graphics processor 100 provides hardware support for 2D and 3D graphics, and for text and windowing operations of a computer system. The graphics processor 100 transfers digital data from the system memory 75 or host processor 100, and processes data for storage in the frame buffer (RDRAM) 75 ultimately for display on the display unit 60. RDRAM 85 of the preferred embodiment is a RAMBUS type dynamic random access memory device.

The host processor 50 and system memory 75 both preferably communicate with the graphics processor 100 via the system bus 25. The system bus 25 preferably is the peripheral component interconnect (PCI) bus.

Still referring to FIG. 4, the graphics processor 100 couples to the system bus 25. In accordance with the preferred embodiment, the graphics processor 100 preferably includes bus mastering capabilities, thus permitting graphics processor 100 to bus master the system bus 25. Graphics processor 100 also couples to a display unit 60 and a frame buffer 85 comprising a dynamic random access memory (DRAM). In the preferred embodiment, a Rambus™ DRAM (RDRAM) is used. However, other DRAM configuration and types may be used.

In the preferred embodiment, the RDRAM 85 comprises a bank of RDRAM buffers, where the digital data stored in the RDRAM comprises a rectangular array of picture elements referred to as pixels or pixel values. Each pixel can be defined by an 8 bit value, for example, which specifies the intensity of a single color of a corresponding pixel on a screen of the display unit 60.

The display unit 60 may be any suitable type of display device, such as a cathode ray tube (CRT) for desktop, workstation or server applications, a liquid crystal display (LCD) or any other suitable display device for a personal computer.

The RDRAM frame buffer 85 provides a performance improvement by permitting faster access to display list instructions and pixel data, compared to accessing data stored in the main memory 75 of the host computer system 400. The graphics processor 100 communicates to the RDRAM buffer 85 through address data and control lines, collectively referred to as a RBUS 318.

Referring now to FIG. 5, the graphics processor 100 preferably includes a register file 135 and a 2D/3D engine 150 for generating three and two dimensional primitives. The system shown in FIG. 5 includes an instruction buffer 155, a host rendering buffer 165 and a host texture buffer 175. Buffers 155, 165 and 175 store the instructions and parameters generated by the graphics application 180. As one skilled in the art will understand, buffers 155, 165 and 175 may reside in the processor 50 or system memory 75 of FIG. 4.

Still referring to FIG. 5, the graphics processor 100 preferably includes the register file 135 and the 2D/3D engine 150. Other logic may also be provided as part of the graphics processor but are left out here so as not to obfuscate the present invention.

The register file 135 receives the instructions and display information from buffer 155 for subsequent use by the 2D/3D engine 150. The 2D/3D engine 150 receives the instructions and display parameters from the register file 135 and generates values for each pixel for rendering on display unit 60. The 2D/3D engine 150 stores the pixel data internally in the storage unit 190 in the graphics processor 100 before rendering the pixels to display unit 60 or to the RDRAM 85 (FIG. 4).

Referring now to FIG. 7 the 2D/3D engine 150 of the preferred embodiments shown. The 2D/3D engine 150 preferably includes SRAM 710, 720 and 730 coupled together for showing pixel address data fetched by the graphics processor 100 for rendering graphics primitive, pixel pipe 740, SRAM 750 and memory control unit (MCU) 760.

As shown in FIG. 7, Rambus™ Interface (RIF) bus 705 couples to SRAM 710, 720 and 730 respectively to interface the SRAM to the RDRAM unit 85 of FIG. 4. SRAM 710, 720 and 730 are tiled in accordance with the tile configuration scheme of FIG. 3. Pixel data needed for rendering graphics primitives by the graphics processor 100 (FIG. 4) are fetched in accordance with the tile X crossing principles of the present invention. Pixel data fetched from SRAM 710, 720 and 730 are transferred via lines 701, 711 and 721 respectively to the 2D/3D pixel pipe 740 under the control of MCU 760.

In the preferred embodiment, MCU 760 includes a variety of logic circuitry to enable the graphics processor 100 fetch data when such spans a tile boundary in a non-sequential manner in accordance with the principles of the present invention. The pixel data fetched from SRAMs 710, 720 and 730 are transferred from the 2D/3D pixel pipe 740 to store SRAM 750 in a sequential manner under the control of MCU 760 before the pixel data is written to RDRAM 85 (FIG. 4) via RIF bus 705.

Referring now to FIG. 8, the MCU 760 fetch and store logic of the preferred embodiment is shown. As shown in FIG. 8, MCU 760 includes MCU fetch logic 800 and MCU store logic 810. MCU fetch logic 800 couples to SRAMs 710, 720 and 730 (FIG. 7) for controlling fetch requests to the SRAMs. In the preferred embodiment, MCU fetch logic 800 includes address look-ahead logic for determining the extent in bytes of the pixel data to be fetched for each access request by the graphics processor 100. MCU 760 further includes logic for determining whether data being fetched from the tiled RDRAMs (FIG. 4) crosses an X boundary. If the data being fetched crosses an X tile boundary, a divide logic in MCU fetch logic 800 divides the access into two separate accesses which are sequentially transferred from tile RDRAM 85 from left to right.

The MCU store logic 810 controls the temporary storing of data fetched by the graphics processor 100 before transferring the data to the graphics rendering engine. MCU store logic 810 includes logic circuitry to predetermine storage space in SRAM 750 before writing data fetched from fetch SRAM 700. In the preferred embodiment MCU store logic 810 also includes an access divide logic which divides the store request in a similar manner as the fetch request accesses are divided in accordance with the principles of the present invention.

Figure 9:
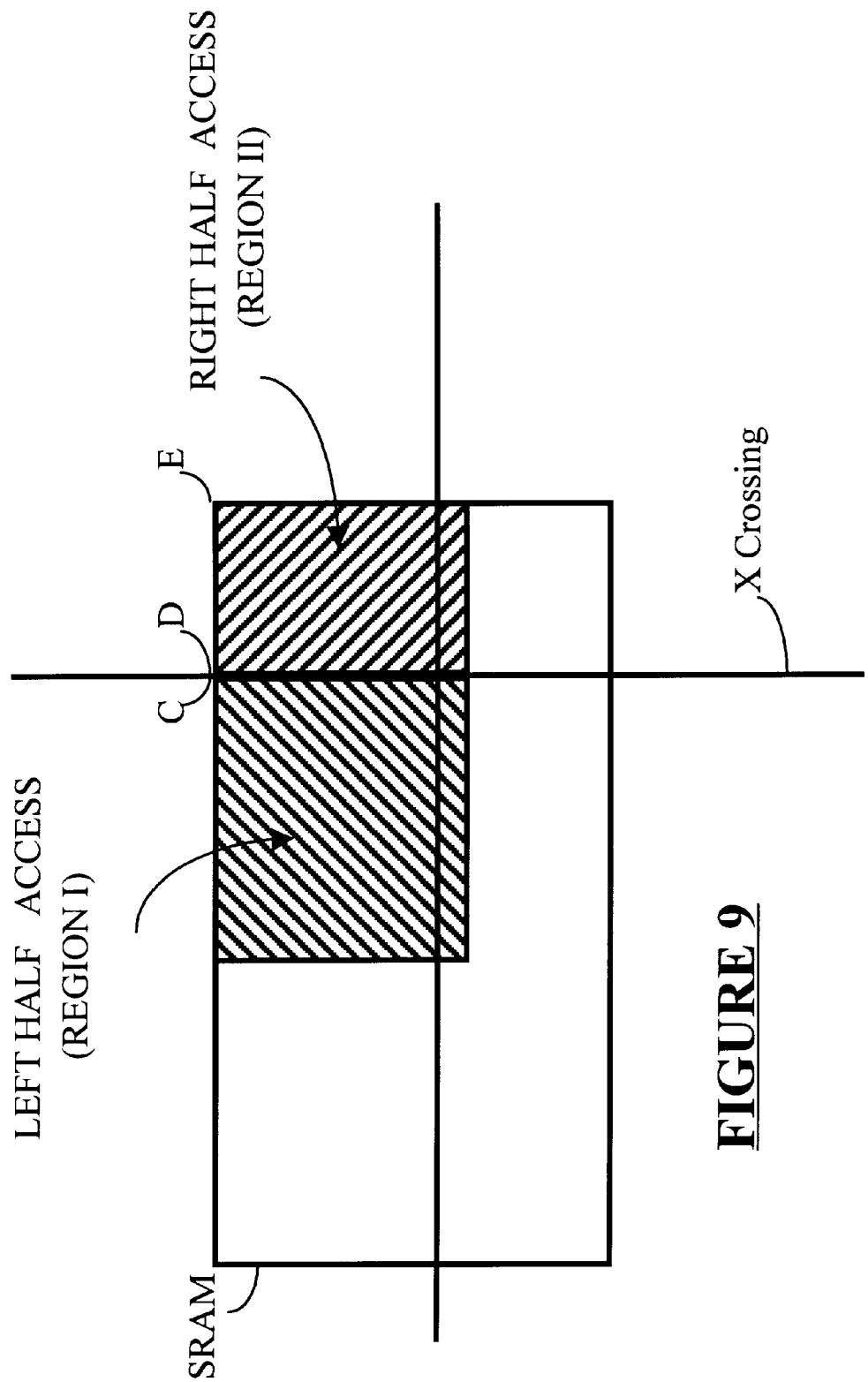
FIG. 9 is an exemplary depiction of a fetch/store sequence to/from the SRAM in FIG. 7 in accordance with the principles of the present invention.

FIG. 9 illustrates the reduced X directional crossing in accordance with the principles of the present invention. X crossing is typically implemented because the internal SRAM (e.g. SRAM 700 and 750 in FIG. 7) in which pixel data is fetched and stored requires sequential accesses to correctly fill the SRAM. Such sequential access requirements incur an inordinate amount of accesses to the RDRAM if data being fetched or stored crosses an X boundary.

In the preferred embodiment, data fetches and stores are non-sequentially implemented in order not to cross an X boundary during s single data fetch or store. The tile access logic of the memory control unit 760 of the preferred embodiment predetermines the extent in bytes from the start of an access (e.g. point A in FIG. 6) to the X crossing (e.g. point B) for an access.

The tile access logic subsequently breaks the access into two separate accesses, one for the left half of the X crossing i.e. region I in FIG. 9 and one for the right half of the X crossing i.e. region II in FIG. 9 of the X crossing. Once the access is broken into two separate accesses, the graphics processor 100 is able to access the SRAM non-sequentially when the extent of one half of the access is reached in a single access request. To illustrate the principle of the preferred embodiment consider an SRAM with the following characteristics:

SRAM size=128 bytes
Tile Width=128
Tile Height=16
Extent X in bytes=16
Extent Y in scanlines=4
Start X position in tile=120
Start Y position in tile=2

To access SRAM in the prior art, the memory controller has to perform 4 X crossings since 4 scanlines in y are accessed. The left half extent in X is calculated by subtracting the start X position from the tile width. This would be 128−120=8. The left access is 8×4 and the right access is 8×4 since the extent is 8

The SRAMs shown in FIG. 7 are preferably each mapped into a 16×8 array of bytes so that at any byte location, the number of bytes from (x,y) to (x,y+1) is 16. The SRAMs may also be mapped into a 1×128, 2×64, 32×4, 64×2 or 128×1 array of bytes. When an SRAM is accessed as each byte is completed, an SRAM address pointer in the accessed SRAM is incremented by 1. When the byte before the X crossing is reached (e.g., point C in FIG. 9), the address pointer is incremented by 16 minus the left extent in x or 16−8=8. As SRAM is accessed, it is filled on one half followed by the other.

In filling the right half, the SRAM address pointer is initialized to the left extent (of the x address pixel data) plus 1 to place on the first byte position after the X crossing, for example, point C (FIG. 9), and incremented by 1 until the SRAM address pointer reaches the extent X or 16. The address pointer is then incremented by 16 minus the right extent in X or 16−8 to the next y location in the SRAM.

Table I below illustrates further the principles of the preferred embodiment. In Table I the byte mapping in an SRAM and the fill sequence relative to the two separate access of each half of the X crossing is illustrated:

TABLE I

| SRAM byte address | Access Number | Address Increment |
|---|---|---|
| 0 | 1 | 1 |
| 1 | 2 | 1 |
| 2 | 3 | 1 |
| 3 | 4 | 1 |
| 4 | 5 | 1 |
| 5 | 6 | 1 |
| 6 | 7 | 1 |
| 7 | 8 | 16 − 8 = 8 |
| 16 | 9 | 1 |
| 17 | 10 | 1 |
| 18 | 11 | 1 |
| 19 | 12 | 1 |
| 20 | 13 | 1 |
| 21 | 14 | 1 |
| 22 | 15 | 1 |
| 23 | 16 | 1 |

By non-sequentially filling SRAM by simultaneously fetching the tile byte in the right and left portions of the X crossing respectively, the preferred embodiment is able to achieve a single crossing in the X direction no matter how many Y scanlines are accessed.

Numerous variations and modifications will become apparent to those skilled in the art once the above disclosure is fully appreciated. It is intended that the following claims be interpreted to embrace all such variations and modifications.

What is claimed is:

1. A graphics system for internally storing and fetching pixel data for rendering a graphics primitive, the system comprising:

a system bus;

a host processor coupled to the system bus for generating graphics primitive address requests to the system bus;

a system memory coupled to the system bus for storing a list of display parameters for the graphics primitives;

a graphics processor coupled to the system bus for processing address requests for the graphics primitives generated by the host processor and rendering the graphics primitives; and a memory control unit coupled to the graphics processor for asserting control signals to allow the graphics processor to interpolate data from a tile configured main storage unit and a tile configured storage random access memory in a non-sequential manner wherein the memory control unit includes a fetch logic for non-sequentially fetching pixel data requested by the graphics processor from the tile configured storage random access memory.

2. The system of claim 1, wherein the memory control unit includes a store logic for non-sequentially storing pixel data to the tile configured storage random access memory of the graphics processor.

3. A graphics processor having a plurality of internal storage means for storing pixel data of a graphics primitive, the graphics processor comprising:

a first plurality of fetch static random access memory (SRAM) devices internally coupled to the graphics processor for storing data fetched by the graphics processor from an external memory source;

a store static random access memory device for storing the pixel data fetched from the first plurality of fetch SRAM devices;

a memory control fetch logic coupled to the first plurality of SRAM devices for controlling fetch requests by a rendering engine in the graphics processor; and a memory control store logic coupled to the second SRAM device for controlling store requests to the SRAM device.

4. The system of claim 3, wherein each of the plurality of fetch SRAM devices includes an address pointer for monitoring when a fetch request to each of said SRAM device is completed, said address pointer incremented by "1" in a subsequent fetch request by the graphics processor to one of said plurality of fetch SRAM devices.

5. The graphics processor of claim 4, wherein the store SRAM device includes an address pointer for determining store locations of a pixel data store, said address pointer being incremented by "1" after a store request to the store SRAM device is completed.

6. The graphics processor of claim 5, wherein the plurality of fetch SRAM devices is mapped into one of a range a 16×8, 1×128, 2×64, 8×16, 32×4, 64×2, 128×1 array of bytes.

7. The graphics processor of claim 6, wherein each of said plurality of fetch SRAM devices is tile configured.

8. The graphics processor of claim 7, wherein the store SRAM device is tile configured.

9. The graphics processor of claim 8, wherein the pixel data is XY pixel addresses respectively representing the width and length values of the primitive being rendered.

10. The graphics processor of claim 9, wherein the fetch logic includes logic to monitor and determine when a fetch request to pixel data in the fetch SRAMs cross an X boundary.

11. The graphics processor of claim 10, wherein the store logic includes logic to monitor and determine when a store request to the store SRAM crosses an X boundary.

12. The graphics processor of claim 11, wherein each of the plurality of fetch SRAMs is 128 bytes wide.

13. The graphics processor of claim 11, wherein pixel data fetches from each of the plurality of fetch SRAM is performed non-sequentially.

14. The graphics processor of claim 13, wherein pixel data stores in the store SRAM is performed non-sequentially.

15. The graphics processor of claim 11, further including a divide logic for dividing a block of pixel data accessed from the fetch SRAM into two separate accesses if the data accessed crosses an X boundary.

16. The graphics processor of claim 15, wherein the fetch logic includes an address pointer incrementing logic for incrementing an address pointer in the fetch SRAMs after each completed fetch of a byte of pixel data by the graphics processor, the addressed pointer being incremented by a value of 1 after a subsequent fetch requests is initiated to the fetch SRAM to fetch pixel data.

17. The graphics processor of claim 16, wherein the fetch request to the fetch SRAM crosses a single X crossing for a corresponding plurality of Y scanlines to fetch a block of pixel data spanning multiple X and Y tiles.

18. The graphics processor of claim 17, wherein a store request to the store SRAM non-sequentially traverses a single X crossing for a corresponding plurality of Y scanlines to store a block of pixel data spanning a plurality of X and Y tiles.

19. The graphics processor of claim 15, wherein the store logic includes an address pointer incrementing logic for incrementing an address pointer in the store SRAMs after each completed store of a byte of pixel data by the graphics processor, the addressed pointer being incremented by a value of 1 after a subsequent store requests is initiated to the store SRAM to store pixel data.

* * * * *